(12) United States Patent
Kerspe et al.

(10) Patent No.: US 10,084,166 B2
(45) Date of Patent: Sep. 25, 2018

(54) METHOD FOR THE PRODUCTION OF A BATTERY HOUSING

(71) Applicant: KOENIG METALL GmbH & Co. KG, Gaggenau (DE)

(72) Inventors: Jobst H. Kerspe, Mauer (DE); Michael Fischer, Gaggenau (DE)

(73) Assignee: KOENIG METALL GmbH & Co. KG, Gaggenau (DE)

( * ) Notice: Subject to any disclaimer, the term of this patent is extended or adjusted under 35 U.S.C. 154(b) by 132 days.

(21) Appl. No.: 15/410,847

(22) Filed: Jan. 20, 2017

(65) Prior Publication Data

US 2017/0214010 A1  Jul. 27, 2017

(30) Foreign Application Priority Data

Jan. 21, 2016 (DE) .......................... 10 2016 101 042
Apr. 1, 2016 (DE) .......................... 10 2016 106 021

(51) Int. Cl.

| | |
|---|---|
| *H01M 10/658* | (2014.01) |
| *H01M 2/10* | (2006.01) |
| *H01M 10/613* | (2014.01) |
| *H01M 10/625* | (2014.01) |
| *H01M 10/655* | (2014.01) |

(52) U.S. Cl.
CPC ....... *H01M 2/1072* (2013.01); *H01M 10/613* (2015.04); *H01M 10/625* (2015.04); *H01M 10/655* (2015.04); *H01M 10/658* (2015.04); *H01M 2220/20* (2013.01)

(58) Field of Classification Search
CPC .......................... H01M 10/625; H01M 10/658
See application file for complete search history.

(56) References Cited

U.S. PATENT DOCUMENTS

| | | |
|---|---|---|
| 5,158,841 A | 10/1992 | Mennicke et al. |
| 2016/0049706 A1 | 2/2016 | Kerspe et al. |

FOREIGN PATENT DOCUMENTS

| | | |
|---|---|---|
| DE | 40 13 269 A1 | 10/1991 |
| DE | 103 19 350 B4 | 11/2004 |
| EP | 0 588 004 A1 | 3/1994 |
| EP | 2 985 804 A1 | 2/2016 |

*Primary Examiner* — Olatunji A Godo
(74) *Attorney, Agent, or Firm* — Collard & Roe, P.C.

(57) ABSTRACT

A method for producing a battery housing produces intermediate products, including a lower and upper half-shell, for connecting these intermediate products with one another at the facility of a battery manufacturer. The battery is set into the lower half-shell, the upper half-shell is set on, the inner wall of the lower half-shell is welded to the inner wall of the upper half-shell, and the outer wall of the lower half-shell is welded to the outer wall of the upper half-shell, with a supported vacuum insulation interposed between the inner and outer walls of the lower and upper half-shell, respectively, to form a reversibly closed battery housing with integrated thermal management for a battery. An assembly kit may be delivered to a battery manufacturer for non-problematical production of a battery housing at the facility of the battery manufacturer to eliminate transport of the battery to the battery housing manufacturer.

20 Claims, 4 Drawing Sheets

METHOD FOR THE PRODUCTION OF A BATTERY HOUSING

CROSS REFERENCE TO RELATED APPLICATIONS

Applicant claims priority under 35 U.S.C. § 119 of German Application No. 10 2016 101 042.1 filed Jan. 21, 2016 and German Application No. 10 2016 106 021.6 filed Apr. 1, 2016, the disclosures of which are incorporated by reference.

BACKGROUND OF THE INVENTION

1. Field of the Invention

The invention relates to a method for the production of a multifunctional battery housing.

2. Description of the Related Art

The demands on battery housings have become rather comprehensive in the meantime. In the case of mobile applications, for example in the automotive sector, the battery cells or modules accommodated in the housing must be mechanically protected, for one thing against vibration stresses during usual travel operation of a vehicle. The battery cells or modules must also be mechanically protected in the event of damage to the vehicle and thereby possibly also to the battery housing in the event of an accident. In many countries, complete encapsulation of the cells of a battery is furthermore required in order to prevent battery fluids or reaction products from leaking, or reaction products from forming, in the event of damage. Ultimately, encapsulation of the battery in the battery housing also serves for fire protection, which is particularly relevant in the vehicle sector.

Particularly in the sector of electrical mobility, further demands are made on such battery housings, which contribute to improving the useful lifetime and also the performance capacity of the batteries used. Even today, it must be ensured that the battery cells accommodated in the battery housing do not cool down to such an extent that the electrochemical processes that occur in the battery freeze up. Furthermore, however, the battery housing must also ensure that excess heat that might occur, for example while performing a rapid charging process of the battery or in the event of increased consumption of power, is reliably conducted away from the battery. In summary, these demands mean that within a battery housing that meets current requirements, the temperature must be maintained within an average permissible range, in other words is not allowed to drop below a defined lower temperature but also not allowed to exceed a defined upper temperature. In the future, it will therefore be necessary to provide intelligent battery housings with intelligent thermal management.

For this purpose, a battery housing for accommodation of a battery module of a vehicle is known from DE 40 13 269 A1, wherein the battery housing is configured as a rigid structural element and the wall elements of the battery housing are configured, in each instance, with double walls, i.e. in a sandwich design with an inner wall and an outer wall disposed at a distance from the inner wall. In this embodiment, the interstice between the inner and outer walls is filled with a porous insulation material, in each instance, and subsequently evacuated. Furthermore, latent heat storage units for cooling the battery modules are provided between the individual battery modules, in order to be able to cool the battery if necessary.

A further battery housing for accommodating a battery module of a vehicle is known from EP 0 588 004 A1. The battery housing is configured as a rigid structural element. The wall elements of the battery housing are configured, in each instance, with double walls, i.e. also in a sandwich design with an inner wall and an outer wall disposed at a distance from the inner wall. The interstice between these inner and outer walls is filled with a porous support material. The cooling elements used for cooling are also disposed in this interstice. This housing, however, is irreversibly connected with the battery cell disposed in the housing, which is produced in a layered construction, comprising, from the outside to the inside, an insulation layer, a heat storage layer, and a cooling layer.

A battery housing for accommodating one or more cell blocks of a battery and having a double wall is also known from EP 2 985 804 A1; its interstice between an inner wall and an outer wall is filled with a supported vacuum insulation composed of porous support material.

Furthermore, a battery box module for a vehicle, particularly for a motor vehicle, is previously known from DE 103 19 350 B4. This module has a mechanically robust box for accommodating a vehicle battery and a lid that closes off the box and can be released from the box, wherein the box has a tub-like double-wall construction with a switchable vacuum insulation, which can be switched back and forth between a thermal pass-through state and a thermal insulation state. The module is additionally provided with an electrical controller, which is responsible for switching the vacuum insulation on and off.

The tub-like construction of the battery box module is furthermore supposed to contribute to capturing at least small amounts of leaking battery acid.

In this connection, a switchable vacuum insulation is understood to mean that when the vacuum insulation is in a non-switched or current-free state, the insulation state of the battery housing is maintained, in other words, in this state heat insulation of the battery exists. In addition, however, the vacuum insulation can be switched on, as a function of the battery temperature and/or of the ambient temperature and/or of the current intensity or other external requirements, and thereby can be put into a thermal pass-through state. For this purpose, a heat insulation material, for example a fine-pored or microporous fill material, is introduced into the double wall of the battery housing, and furthermore its interior is evacuated, in order to thereby produce low heat conductivity. In addition, a metal hydride getter is integrated into the interior of this insulation. This getter is able to store hydrogen at temperatures below approximately 100° C. When the getter heats up, a defined hydrogen partial pressure can thereby be produced in this heat insulation layer. This arrangement, in combination with the evacuated insulation layer, leads to a significant increase in the heat conductivity of the molded insulation part. This state is then referred to as the pass-through state of the heat insulation, i.e. the insulation state of the battery housing is cancelled out, to a great extent, and the excess heat can be conducted away to the outside by the battery housing.

It is understood that the production of such battery housing represents a highly complex task, particularly for the manufacturer of the battery housing, wherein the manufacturer usually does not have the know-how for production of the vehicle battery or other battery to be accommodated in the housing. Conversely, the manufacturer of a vehicle battery usually does not have the necessary machines and the necessary know-how to be able to produce the battery housing having the increased requirements described above.

Because the battery is supposed to be accommodated in the battery housing after production has been completed, it would be obvious for the battery manufacturer to convey the battery to the manufacturer of the battery housing, for the purpose of production of the battery housing and thereby for production of the end product; this manufacturer would then integrate the battery into the battery housing to be produced, and subsequently close off the housing, in reversible or irreversible manner. In this connection, however, it has been shown that transport of a battery in the performance range in question here in turn is highly dangerous in itself, because such a battery possesses voltage-conducting parts that are provided with voltages on the order of several hundred volts or even kilovolts. For one thing, transport of such batteries is therefore highly dangerous, but their further handling and processing at the facility of the manufacturer of the battery housing is just as dangerous.

SUMMARY OF THE INVENTION

Proceeding from this set of problems, the invention is based on the task of providing a method for the production of a multifunctional battery housing, in which an intermediate product or assembly kit is first produced, which product or kit consists, in the end result, of non-hazardous individual parts, which can then easily be shipped and handed over to a battery manufacturer, for example, which manufacturer then can assemble these non-hazardous individual parts, using comparatively simple technical means, to produce the finished multifunctional battery housing having properties according to EP 2 985 804 A1, with then the battery already integrated into it.

This task is accomplished by a method according to the invention. Advantageous embodiments of the invention are discussed below.

According to the invention, the battery housing having the integrated thermal management as described first of all comprises an upper and a lower half-shell, which are then connected with one another at a later point in time to produce a battery housing. At first, however, a lower half-shell, comprising an inner wall and an outer wall, with molded insulation parts that lie in between, are first pre-manufactured as partial intermediate products, in such a manner that after complete assembly of the battery housing and evacuation of the insulation gap, a battery housing having the properties of the thermal management described above and of the protective function, for example crash safety of the battery accommodated in the battery housing, is produced. As a further partial intermediate product, a pre-manufactured inner wall and a pre-formed outer wall are produced, wherein these two partial intermediate products are then joined together, for example at the facility of a battery manufacturer, in such a manner that first, the battery is set into the pre-manufactured lower half-shell, then the inner wall of the upper half-shell is connected with the inner wall of the lower half-shell, and subsequently, the outer wall of the upper half-shell is set on, with the interposition of the pre-formed molded insulation part(s), and reversibly connected with the outer wall of the lower half-shell. In this regard, the connection of the inner wall of the upper half-shell with the inner wall of the lower half-shell, as well as of the outer wall of the upper half-shell with the outer wall of the lower half-shell is preferably produced by means of a simple weld seam, particularly a laser weld seam, so that this work can also be easily performed in the facility of a battery manufacturer.

In an advantageous embodiment, the inner and outer walls of the double-wall lower half-shell and/or of the upper half-shell are produced by way of hydro-forming, in each instance, in other words by means of a forming process in the autoclave, in a closed forming tool, by means of an inner pressure that is introduced into the corresponding forming tool. In this regard, the forming pressure is introduced into the forming tool in known manner, for example by means of a water/oil emulsion.

With this method, both the inner walls and the outer walls of the upper or lower half-shell can be produced in great numbers and at a high cycle count. Furthermore, the method for production of the two half-shells can be carried out with an integrated molded insulation part or integrated molded insulation parts, in a single forming process, in other words with simultaneous forming of the inner and outer wall. In this regard, this method is therefore double-forming in the actual sense. In the end result, the half-shells therefore consist of a double metal sheet with a molded insulation part or molded insulation parts that lie in between, wherein in the case of double-forming in a previous stage, the double metal sheet arrangement with the molded insulation part or molded insulation parts disposed between the inner and the outer wall is already partially welded, in order to ensure that the molded insulation part(s) remain in their intended place during the forming process.

In this regard, the individual half-shells are produced in such a manner that they consist, in each instance, of an inner and an outer wall, between which molded insulation parts are disposed. After the battery is set in, inner walls of the lower and upper half-shell and subsequently the outer walls of the lower and upper half-shell are welded to one another. In this regard, different welding methods can certainly be used, for example WIG welding or laser welding. It is also conceivable to implement the connection by means of a vacuum-tight adhesive connection, for example using epoxy resin adhesives.

In a further embodiment, the double-wall lower or also upper half-shell produced in this manner can additionally be reinforced with a sheet-metal cuff that engages around the outer wall on the outside. In this way, greater reinforcement of the battery housing and thereby greater crash safety is achieved, as needed.

Further reinforcement of the outer walls of the half-shells can be implemented, section by section, preferably in the region of attachment elements that are to be attached to the battery housing later or are already provided, which are provided for later attachment of the battery housing to the vehicle body of a vehicle, using what are called "tailored blanks," in other words additional reinforcement plates.

The battery housing according to the invention, as a double sheet-metal construction with support material in between, already possesses great robustness to prevent objects from penetrating it. By additionally providing the outer wall of the lower half-shell with a bulletproof plate or a bulletproof molded part, this protection can be further improved, in lasting manner. Aside from the improved protection of the battery accommodated in the battery housing, in this way damage to the insulation sheath by means of foreign bodies that might penetrate it is also prevented; if this penetration were to happen, the insulation effect would be significantly impaired, due to a possible vacuum loss in the event of damage to the outer half-shell over a large area.

In an advantageous further development of this embodiment, the plate or the molded part is produced from a light material, on the one hand, but at the same time, this material is configured to be impact-resistant and high-strength. Here, possible materials are, in particular, hybrid materials produced with a layered structure, for example, with the layers light metal/plastic/light metal, or light-metal structural materials, such as foamed aluminum, for example.

In yet another advantageous further development, the bulletproof plate or the bulletproof molded part is attached in interchangeable manner, for example by means of tension bands, adhesion or sheet-metal tab/clip elements, preferably with the inclusion of an air gap.

After insertion of the battery into the lower half-shell, the lower half-shell can then be connected with the upper half-shell by means of laser weld seams. These welded seams can be opened up, if necessary, for example in connection with possible maintenance work, in comparatively simple manner, and can be closed off again after completion of the maintenance work.

In a preferred embodiment, these operations are possible by forming circumferential sheet-metal lugs onto the top edge of the outer wall of the lower half-shell and onto the bottom edge of the outer wall of the upper half-shell, in each instance, which are then rolled into one another, forming a rolled seam, and welded to one another.

As has already been explained above, additional heat insulation of the battery can be achieved in that the molded insulation parts disposed in the region between the inner wall and the outer wall of the half-shells are evacuated, and thereby vacuum insulation is produced. The heat conductivity of the vacuum insulation can be significantly increased by means of integrated metal hydride getters, and thereby it can be switched from a state of heat insulation to a pass-through state. To evacuate the completely installed housing components or half-shells, which are welded in vacuum-tight manner, the half-shells or the half-shell sections are provided, in each instance, with one or more vacuum ports for evacuation of the fiberboard that lies on the inside.

In a concrete embodiment, such a vacuum port comprises, according to another aspect of the invention, first of all an opening in the outer wall of the half-shell, wherein this opening is encompassed by a stair-like, metallic suction flange, which forms a step that is equipped with a metallic sealing compound, preferably silver or other vacuum-capable solder. Furthermore, this opening is covered, by a wire mesh that is connected with the suction flange, wherein the opening is provided with a lid element that is domed convexly outward, on its top edge that faces away from the insulation and support material, in other words, in particular, the molded insulation parts. The wire mesh serves for the purpose of preventing or at least minimizing suction of fibers and/or fiber materials by the vacuum pump, during evacuation of the insulation formed by the molded insulation parts. The lid element is unable to completely cover the opening, because of its convex curvature, and is held in its intended position, in other words leaving the opening open, by means of a corresponding apparatus.

Furthermore, a vacuum extractor that covers the opening, with a vacuum pump attached to it for producing a partial vacuum, can then be connected above the opening, so that the insulation gap, filled with insulation material and/or support material, is evacuated as intended. In a further step, the domed lid is subsequently spread open by means of a punch integrated into the vacuum extractor, and in this way, according to the known "clicker principle," is pressed so far into the metallic sealing compound until the lid element now closes the opening in its planar expanse and remains in this position. The lid is held in its position that closes the opening, by means of its inherent tension, and therefore the opening is closed in vacuum-tight manner.

In an alternative embodiment, the vacuum port once again comprises the aforementioned opening, wherein an edging of this opening is once again provided with a metallic sealing compound, preferably silver solder, on its surface facing away from the insulation material and/or support material. A lid element is held in place above this opening, by means of a holding rod, wherein the entire apparatus is covered by a vacuum extractor with a connected vacuum pump, so that the integrated insulation and support material, particularly the aforementioned fiberboard, can be evacuated by way of the vacuum pump, through the opening. After completion of the evacuation process, the sealing mass can once again be inductively heated and liquefied by means of inductive heating, wherein then, the holder of the lid element is released and the lid element is again lowered by means of a corresponding punch, if applicable, and pressed into the liquid sealing compound, so that after cooling and hardening of the metallic sealing compound, the opening of the vacuum port has been closed in vacuum-tight manner. Afterward, the vacuum extractor with the connected vacuum pump can be removed.

In yet another alternative embodiment, the vacuum port once again has the aforementioned opening to the insulation material and/or support material integrated in the region between inner and outer wall of a half-shell, wherein the opening has a funnel-like structure, which can be closed off, after evacuation has taken place, with a plug shaped to correspond to the opening structured in funnel-like manner, and can then be fixed in place in this closure position by means of a laser weld seam or some other weld seam.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
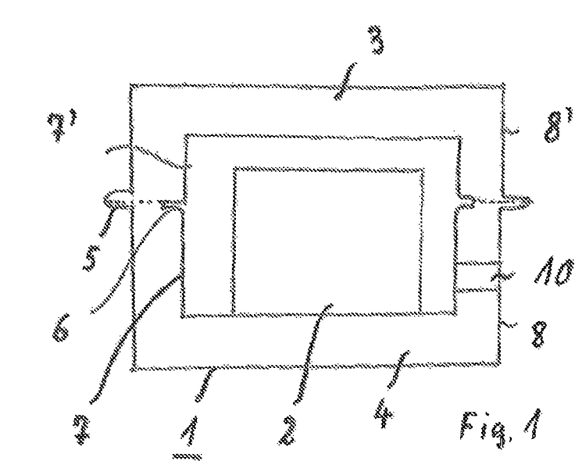
FIG. 1 is a front view of a battery housing with a battery accommodated in it.

FIG. 1 shows a battery housing 1 with a battery 2 accommodated in the battery housing. The battery housing 1 comprises two half-shells, namely an upper half-shell 3 and a lower half-shell 4, which are reversibly connected with one another by means of laser weld seams, in each instance, an inner weld seam 6 and an outer weld seam 5. Each of the two half-shells possesses an inner wall 7, 7' as well as an outer wall 8, 8'.

A support vacuum insulation in the form of what are called molded insulation parts 11 (see FIG. 2A) is introduced between the inner wall 7 and the outer wall 8 of the lower half-shell 4, and between the inner wall 7' and the outer wall 8' of the upper half-shell 3, in each instance, which insulation is firmly connected with the respective inner or outer wall 7, 7' or 8, 8', using what is called sandwich construction. In this regard, what is called "supported vacuum insulation" composed of the inner and outer shells and the support or insulation or fill material that is situated in the insulation gap between the inner and outer shells is formed here. This insulation gap is then evacuated, whereupon a sandwich structure is then formed on the basis of the external pressure stress. Not only the low heat conductivity required for thermal management but also the great strength and rigidity required for crash safety results from this evacuation.

The corresponding embodiment of the battery housing 1 makes it possible to deliver an intermediate product to a battery manufacturer, consisting of the lower half-shell 4, which has already been completed, comprising an inner wall 7 and an outer wall 8, wherein the insulation gap filled with molded insulation parts 11 has already been formed between these two walls, which gap is evacuated after complete assembly and closing of the battery housing 1, and then the support vacuum insulation that forms after evacuation is formed. Furthermore, this lower half-shell 4 can be provided with a vacuum-tight duct 10 for the electrical connection of the battery 2. The battery 2 that is required or desired, in each instance, is then set into this lower half-shell 4 at the facility of the battery manufacturer or at a different location, and already electrically connected by way of the duct 10, if applicable.

Then the inner wall 7' of the upper half-shell 3 is first set onto the lower half-shell 4, and connected with the inner wall 7 of the lower half-shell 4 by means of an inner laser weld seam 6. Then the inner wall 7' is sheathed, as intended, with pre-formed insulation parts 11, i.e. surrounded by a suitable insulation material and/or support material 24, and subsequently the outer wall 8' of the upper half-shell 3 is set on. In a further step, the outer wall 8' of the upper half-shell 3 can then be connected with the outer wall 8 of the lower half-shell 4, by means of a further laser weld seam 5. In this regard, the weld seams can be opened up and closed again if necessary, for example in the event of maintenance or repair.

The method characteristics described in the aforementioned paragraph are comparatively simple, because they essentially consist simply of affixing the weld seams 5, 6 to connect the inner and outer wall elements of the upper and lower half-shells 3 and 4. They can therefore be undertaken by a battery manufacturer, for example, so that in contrast to the state of the art, the battery 2 no longer has to be shipped to the forming enterprise, but rather, instead, the complicated intermediate products produced by the forming enterprise can be transmitted to the battery manufacturer for final production of the battery housing 1. Accordingly, an assembly kit is delivered to the battery manufacturer, which can be used for production of a battery housing 1 by means of simple assembly, closure, and evacuation.

Figure 2A:
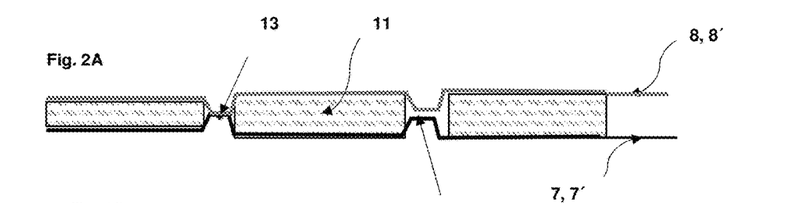
FIG. 2A is a cross-sectional view of a detail of the double-wall battery housing before forming.
Figure 2B:
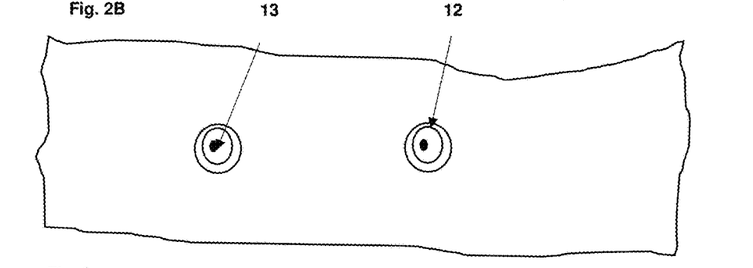
FIG. 2B is a top view of the detail shown in FIG. 2A.

In an alternative embodiment, the double-wall wall elements of the upper and/or lower half-shell 3 and 4 can be pre-formed in sections, in each instance, in accordance with FIGS. 2A and 2B, so that the molded insulation parts 11 provided between the inner and the outer wall are already disposed in their correct positioning before the forming process, in each instance.

FIG. 2A shows, in cross-section, a corresponding double sheet-metal arrangement for later formation of an upper or lower half-shell 3 or 4, having an inner wall 7 and an outer wall 8, between which a molded insulation part 11 is disposed, in each instance. In order to hold the molded insulation parts 11 in their intended position, the walls are provided with corresponding constrictions 12, which preclude slipping of the molded insulation parts 11 in the interstice between the inner wall and outer wall 7 and 8 or 7' and 8', respectively. In order to keep the corresponding constrictions 12 stable, these constrictions 12 are additionally secured by means of corresponding weld seams or points 13.

FIG. 2B shows the double sheet-metal arrangement in a top view, wherein the position of the weld points 13 in the region of the constrictions 12 is particularly evident from this view.

Figure 3:
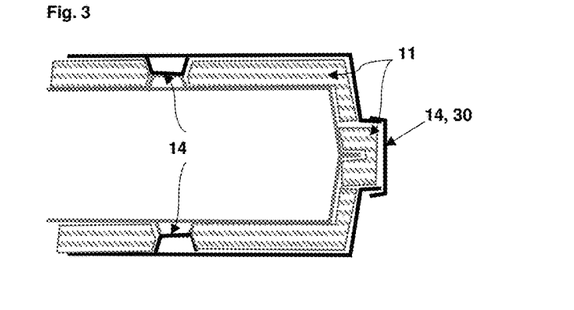
FIG. 3 is a cross-sectional view of a detail of the double-wall battery housing after forming.

FIG. 3 then shows the double-wall construction of a half-shell after the forming process has been completed, wherein the forming process takes place for production of the actual half-shell, whether the half-shell produced is the upper half-shell 3 or the lower half-shell 4, preferably by way of the hydro-forming already mentioned, in other words, in the present case, double forming of the respective inner wall 7, 7' and the respective outer wall 8, 8', with the interposition of the molded insulation parts 11 that have already been integrated, wherein then, in a further step, the outer wall 8 or 8' can be reinforced, according to the representation in FIG. 3, with an additional, sheet-metal cuff 14 that encompasses the respective outer wall 8 or 8', if applicable.

Figure 4:
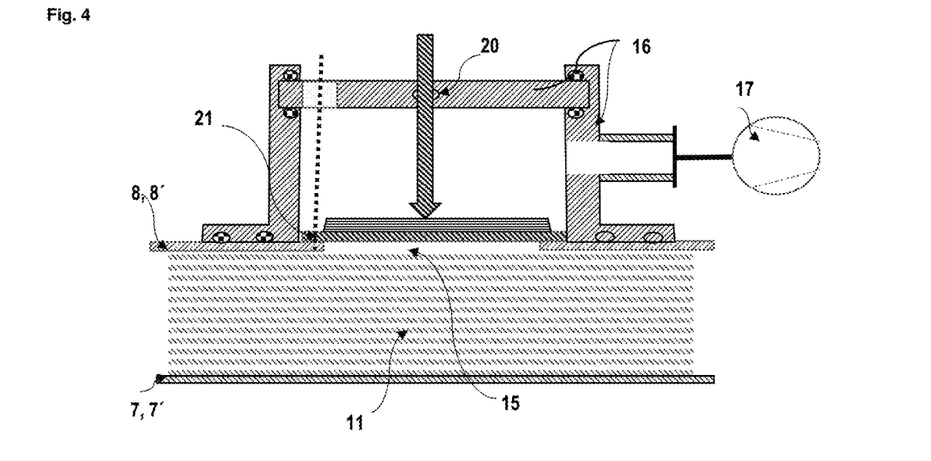
FIG. 4 shows a closure of the vacuum port with a domed lid.

FIG. 4, in a cross-sectional view, shows a method and an apparatus for evacuation of the vacuum insulation provided between the inner walls 7, 7' and the outer walls 8, 8', here, in particular, implemented in the form of a molded insulation part 11 or multiple molded insulation parts disposed between the inner walls 7, 7' and the outer walls 8, 8', in this region. For this purpose, the outer wall 8, 8' is provided with one or more openings 15, on which a vacuum extractor 16 with a vacuum pump 17 can be connected, in order to evacuate the region of the supported vacuum insulation. In this way, the heat conductivity of the material used for the support vacuum insulation is lowered, as intended, i.e. its insulation effect is increased. In a concrete embodiment, the vacuum extractor 16, not shown in any detail, is provided with a push duct 20 for a planar lid element 21, which can be lowered after evacuation of the region of the supported vacuum insulation has taken place and can close off the opening 15, in vacuum-tight manner, using a laser weld seam, i.e. can be lowered into a metallic sealing compound, which can be inductively heated and subsequently cooled, so that in this way, reversible closure of the vacuum port is achieved by means of the planar lid element 21, after evacuation of the vacuum insulation that lies on the inside has been completed.

Figure 5:
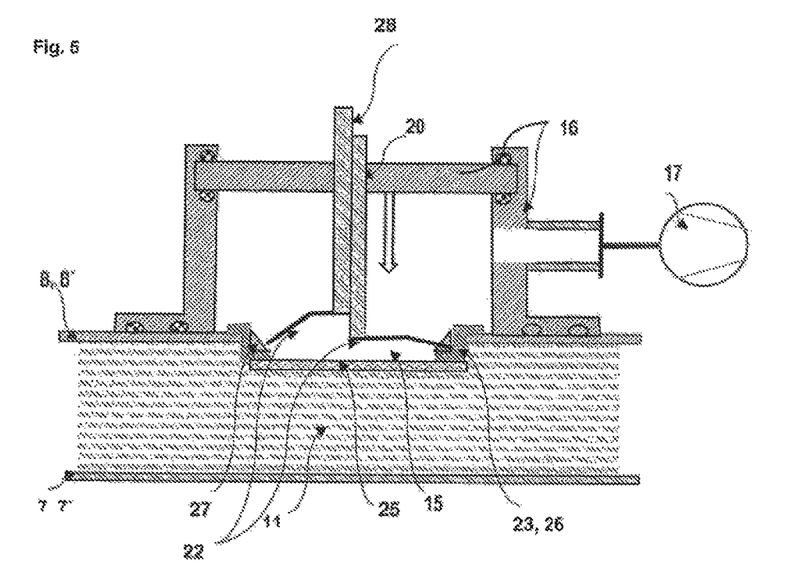
FIG. 5 shows a closure of the vacuum port with a planar lid.

In an alternative embodiment according to FIG. 5, the said opening 15 can also be provided with a convex domed lid element 22, which does not close off the opening 15 in its domed original position. In this regard, the lid element 22 is set onto a suction flange 23 that encloses the opening, which flange is welded to a metallic wire mesh 25 on its side facing the insulation material 11. On the basis of its stair-like structure, the suction flange 23 forms a step 26, wherein a metallic sealing compound, preferably silver solder, that encompasses the opening 15, is applied on the top of this step 26, facing away from the opening. The entire arrangement as well as, in particular, the opening 15 is in turn covered by a vacuum extractor 16 with a connected vacuum pump 17, by means of which the insulation material 11 can be evacuated through the opening 15, as intended. In this regard, the wire mesh regains the insulation material drawn in during evacuation, because otherwise, the vacuum pump could become clogged. Furthermore, a punch 28 that can be lowered is integrated into the vacuum extractor 16. Using this punch 28, the lid element 22, which is domed at first, is pressed down in such a manner that it is pressed flat, consequently closing the opening 15 and pressing the outer circumference of the domed lid element 22 into the sealing compound 27, so that then the originally domed lid element 22 completely closes off the opening 15, because of its now enlarged circumference, in vacuum-tight manner. After closure of the opening 15 by means of the originally domed lid element 22 has taken place in this manner, the insulation gap filled with support and insulation material 11 is evacuated and closed off in vacuum-tight manner.

Figure 6:
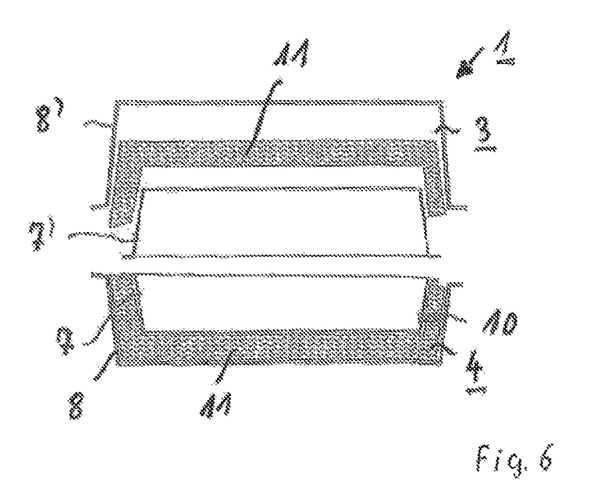
FIG. 6 is a cross-sectional view of a battery housing in an exploded representation.

FIG. 6 shows an alternative embodiment of the method according to the invention. In this regard, the pre-manufactured lower half-shell 4 according to the method described above at first consists of an outer wall 8, in other words an outer metal sheet, as well as of an inner wall 7 disposed at a distance from the outer wall 8, in other words a region between which one or more molded insulation parts 11 are disposed. These components of the lower half-shell are already pre-assembled and glued to one another for the purpose of easier handling. Furthermore, the lower half-shell has a duct 10, through which electrical connectors, for example, for the battery 2 accommodated in the battery housing 1 to be produced, can be passed from the outside into the interior of the lower half-shell 4.

In this regard, the upper half-shell 3 of this alternative embodiment also has an outer wall 8' and an inner wall 7', in keeping with the previous embodiment, between which walls one or more molded insulation part(s) 11 is/are disposed.

Accordingly, both the lower 4 and also the upper half-shell 3, i.e. their components, are pre-manufactured, ready for installation, in this embodiment.

This completely pre-manufactured lower half-shell 4 is then delivered in connection with the individual parts of the upper half-shell 3. These parts again are the already pre-formed inner wall 7' and the pre-formed outer wall 8', wherein these walls are metal sheets produced by way of hydro-forming, in each instance. Additionally, molded insulation parts 11 that are also already pre-formed, or an individual pre-formed molded insulation part is delivered for interposition between the inner wall 7' and the outer wall 8' of the upper half-shell 3.

The connection of the lower half-shell with the upper half-shell then takes place analogous to the previous embodiment, i.e. the inner and outer walls are welded to one another according to one of the methods described above, in order to form a closed battery housing 1. This welding takes place only after the battery 2 has been inserted into the lower half-shell 4, as intended, and has been connected by way of the duct 10, if applicable.

Figure 7:
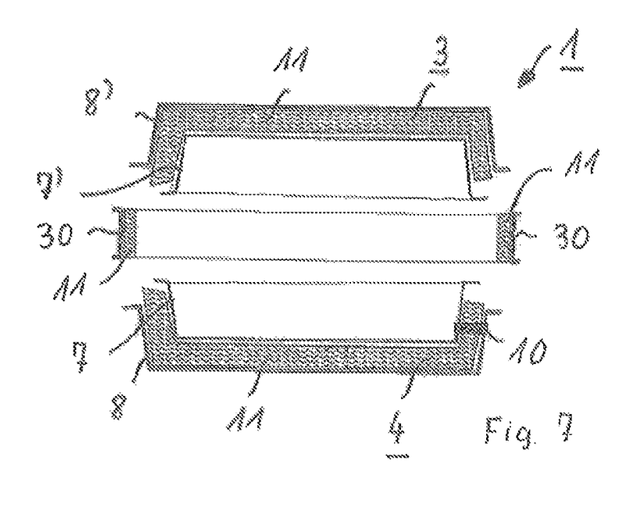
FIG. 7 is a cross-sectional view of an alternative embodiment of the battery housing in an exploded representation.

In yet another alternative embodiment according to FIG. 7, the upper half-shell 3 can also be delivered as a completely pre-manufactured intermediate product, in addition to the lower half-shell that has already been produced as a finished assembled intermediate product, which was produced as described in connection with FIGS. 2A, 2B, and 3. There is the difference, however, that the outer wall 8' of the upper half-shell 3, and also the outer wall 8 of the lower half-shell, have a clear setback relative to the top edge of the outer wall 8 of the lower half-shell 4, in each instance. This setback holds true both for the upper and for the lower half-shell.

Accordingly, in a further processing step, first the inner wall 7, 7' of the lower half-shell 4 and the upper half-shell 3 are welded to one another, so that after this preliminary closing of the battery housing 1, which is undertaken only after the battery 2 has been set into the lower half-shell 4, a gap exists between the insulation material of the lower half-shell 4 and the insulation material of the upper half-shell 3, as does a gap between the outer wall 8 of the lower half-shell 4 and the outer wall 8' of the upper half-shell 3. This gap can then be closed by means of a ring-shaped metal sheet 30 that encloses the battery housing 1, which sheet is welded to itself in its overlap region—analogous to a barrel stave—and thereby closes off the battery housing 1 on the outside.

In an advantageous embodiment, this ring-shaped metal sheet 30 is previously adhesively connected with a suitable molded insulation part 11 on its side facing the interior of the battery housing 1, so that insulation of the battery housing 1 is ensured also in the region of this ring cuff.

In an alternative embodiment, instead of a single ring cuff or a single ring-shaped metal sheet 30, multiple ring-shaped metal sheets can also be provided with one another, until a ring-shaped metal sheet 30 that completely encompasses the battery housing 1 is formed, in order to close off the battery housing 1 as intended. The advantage of this solution consists in that the upper half-shell 3 can also be delivered as a completely pre-assembled intermediate product, wherein this advantage is paid for with the additional effort, which is, however, comparatively simple, namely affixation of the ring cuff that has been mentioned.

Although only a few embodiments of the present invention have been shown and described, it is to be understood that many changes and modifications may be made thereunto without departing from the spirit and scope of the invention.

What is claimed is:

1. A method for the production of a multifunctional battery housing with integrated thermal management, the battery housing comprising an upper half-shell and a lower half-shell connected to the upper half-shell, the method comprising:
    (a) forming a first partial intermediate product comprising the lower half-shell and molded insulation parts, wherein the lower half-shell comprises an inner wall and an outer wall and the molded insulation parts are disposed between the inner wall and the outer wall for insulation or support;
    (b) forming a second partial intermediate product comprising the upper half-shell and pre-manufactured molded insulation parts, wherein the upper half-shell comprises a pre-formed inner wall and a pre-formed outer wall and the pre-manufactured molded insulation parts are interposed between the pre-formed inner wall and the pre-formed outer wall;
    (c) joining together the first and second partial intermediate parts to produce the battery housing with an integrated battery so that the battery is set on site into the lower half-shell;
    (d) connecting the pre-formed inner wall of the upper half-shell with the inner wall of the lower half-shell by openable weld seams; and
    (e) subsequently setting the pre-formed outer wall of the upper half-shell onto the pre-formed inner wall of the upper half-shell with the pre-manufactured molded insulation parts interposed between the pre-formed inner and outer walls and connecting the pre-formed outer wall of the upper half-shell with the outer wall of the lower half-shell by openable weld seams.

2. The method according to claim 1, wherein the first and second partial intermediate parts are joined together at a facility of a battery manufacturer.

3. The method according to claim 1, wherein the inner wall and the outer wall of the lower half-shell are produced by way of hydro-forming and the pre-formed inner wall and the pre-formed outer wall of the upper half-shell are produced by way of hydro-forming, the lower half-shell and the upper half-shell each having a double-walled construction.

4. The method according to claim 1, wherein the upper and lower half-shells are produced so that each of the upper and lower half-shells individually comprises an inner and an outer wall, with the interposition of a molded insulation part, in each instance.

5. The method according to claim 1, further comprising a sheet-metal cuff reinforcing and externally encompassing at least one of the outer wall of the lower half-shell and the outer wall of the upper half-shell.

6. The method according to claim 5, further comprising tailored blanks additionally reinforcing section by section at least one of the outer wall of the lower half-shell and the outer wall of the upper half-shell.

7. The method according to claim 6, wherein the tailored blanks provide additional reinforcement in a region of attachment elements for connecting the battery housing with a vehicle body.

8. The method according to claim 1, wherein the outer wall of the lower half-shell is additionally firmly connected with a bulletproof plate or a bulletproof molded part adapted to an outer contour of the lower half-shell, at least in certain sections.

9. The method according to claim 8, wherein the bulletproof plate or the bulletproof molded part is light-weight, impact-resistant, and high-strength.

10. The method according to claim 9, wherein the bulletproof plate or the bulletproof molded part is connected with the lower half-shell in interchangeable manner.

11. The method according to claim 1, wherein the half-shells are connected with one another by circumferential weld seams after the battery has been set into the lower half-shell.

12. The method according to claim 1, wherein a top edge of the lower half-shell and a bottom edge of the upper half-shell are provided with circumferential sheet-metal lugs on the outer walls, in each instance, wherein the lugs are rolled into one another, forming a rolled seam, and welded to one another.

13. The method according to claim 1, wherein the half-shells or the half-shell sections of the half-shells are provided, in each instance, with one or more vacuum ports for evacuating the molded insulation part that lies on the inside of the half-shells.

14. The method according to claim 13, wherein the vacuum port comprises, in each instance, an opening in the outer wall of the lower half-shell or the upper half-shell, wherein a stair-shaped, metallic suction flange encompasses the opening and forms a step equipped with a metallic sealing compound, and wherein the suction flange is welded to a wire mesh that covers the opening, on a lower edge that faces insulation or support material, and is provided, on the step, on a top edge that faces away from the insulation or support material, with a lid element having a domed state in which the lid element is domed convexly outward, wherein the lid element does not cover the opening in the domed state, and subsequently a vacuum extractor that covers the opening and has a connected vacuum pump is connected with the vacuum port and is used to evacuate the support or insulation material that lies inside, and thereafter the lid element is spread by a punch integrated into the vacuum extractor, and consequently pressed into the metallic sealing compound, and as a result the opening is closed off and sealed.

15. The method according to claim 13, wherein the vacuum port comprises an opening of the outer wall of the lower half-shell or the upper half-shell, wherein the edging of the opening has an edging provided with a metallic sealing compound, on a surface that faces away from the insulation or support material, and a lid element is held in place above the opening, at a distance, using a holding rod, and the opening is covered by a vacuum extractor with a connected vacuum pump, for evacuating after complete assembly and joining and closing of the half-shells with the insulation or support material inside an insulation gap situated between the inner and outer walls, and subsequently, the metallic sealing compound is inductively heated until the metallic sealing compound becomes liquid, and thereafter the holder of the lid element is released, consequently the lid element is lowered so that the lid element covers the opening and an outer circumference of the lid element is immersed in the heated metallic sealing compound, then the inductive heating is shut off and, after cooling and hardening of the metallic sealing compound, the opening is closed off.

16. The method according to claim 13, wherein the vacuum port comprises an opening of the outer wall of the lower half-shell or the upper half-shell, in each instance, wherein the opening is covered by a vacuum extractor with a connected vacuum pump, for evacuating the support or insulation material that lies inside, and subsequently the opening is closed off with a plug that is closed off, in vacuum-tight manner, by a weld seam in a closure position of the vacuum port.

17. The method according to claim 1, wherein the lower half-shell is pre-manufactured as the first partial intermediate product, comprising an inner wall and an outer wall, wherein one or more molded insulation parts are disposed as insulation or support material between the inner and outer walls, and having a duct for one or more electrical connectors to extend from inside the first partial intermediate product, through the inner wall, the insulation or support material, and the outer wall, to outside the first partial intermediate product, and the first partial intermediate product is equipped with the battery and supplemented with the second partial intermediate product of the upper half-shell to produce the battery housing having an insulation gap between the inner and outer walls, after complete assembly and joining and closing off of the half-shells, wherein the insulation gap is evacuatable by way of one or more vacuum ports.

18. The method according to claim 1, wherein the lower half-shell is pre-manufactured as a partial intermediate product, comprising an inner wall and an outer wall, wherein one or more molded insulation parts are disposed as insulation or support material, between the inner and outer walls, and having a duct for one or more electrical connectors to extend from inside the partial intermediate product, through the inner wall, the insulation or support material, and the outer wall, to outside the partial intermediate product, and the upper half-shell, comprising a pre-formed inner wall and a pre-formed outer wall, is produced with the interposition of one or more pre-manufactured molded insulation parts, and after the battery is set into the lower half-shell, the upper half-shell is set onto the lower half-shell with shape fit, and subsequently the outer walls of the half-shells are connected with one another in a connection region, in vacuum-tight manner, by a circumferential ring-shaped metal sheet or multiple ring-shaped metal-sheet sections that complement one another to form a ring-shaped metal sheet.

19. The method according to claim 18, wherein the circumferential ring-shaped metal sheet or the ring-shaped metal-sheet sections that complement one another to form a ring-shaped metal sheet are equipped with a corresponding molded insulation part on a side that faces an interior of the battery housing, in each instance.

20. The method according to claim 18, wherein the outer walls of the lower half-shell and upper half-shell are spaced apart from one another so that the inner walls are connectable with one another by a circumferential weld seam, through a gap opened between the outer walls.

* * * * *